(12) United States Patent
Shabtai et al.

(10) Patent No.: US 9,344,876 B2
(45) Date of Patent: May 17, 2016

(54) SYSTEMS AND METHODS FOR PREDICTIVE DOWNLOAD

(71) Applicant: Facebook, Inc., Menlo Park, CA (US)

(72) Inventors: Daniel Shabtai, Sunnyvale, CA (US); Justin Alexander Shaffer, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 198 days.

(21) Appl. No.: 14/140,287

(22) Filed: Dec. 24, 2013

(65) Prior Publication Data

US 2015/0178370 A1 Jun. 25, 2015

(51) Int. Cl.
G06F 7/00 (2006.01)
G06F 17/30 (2006.01)
H04W 8/20 (2009.01)
H04L 29/08 (2006.01)

(52) U.S. Cl.
CPC ........... *H04W 8/20* (2013.01); *G06F 17/30902* (2013.01); *H04L 67/06* (2013.01)

(58) Field of Classification Search
CPC .... G06F 9/546; G06F 8/65; G06F 2221/2111
See application file for complete search history.

(56) References Cited

U.S. PATENT DOCUMENTS

| | | | | |
|---|---|---|---|---|
| 2006/0065717 | A1* | 3/2006 | Hurwitz | G06Q 10/087 235/381 |
| 2009/0138907 | A1* | 5/2009 | Wiser | H04N 5/4403 725/34 |
| 2010/0205292 | A1* | 8/2010 | Diaz | H04L 12/40013 709/224 |
| 2013/0067170 | A1* | 3/2013 | Lam | G06F 17/30902 711/137 |
| 2013/0117349 | A1* | 5/2013 | Burnette | G06Q 30/0202 709/202 |
| 2013/0176846 | A1* | 7/2013 | Callard | H04L 67/06 370/230 |
| 2014/0032915 | A1* | 1/2014 | Muzammil | H04L 9/3236 713/176 |
| 2014/0282636 | A1* | 9/2014 | Petander | H04N 21/4663 725/1 |

* cited by examiner

*Primary Examiner* — Tuan A Pham
(74) *Attorney, Agent, or Firm* — Sheppard Mullin Richter & Hampton LLP

(57) ABSTRACT

A time a user of a client application is likely to access a preferred network connection is predicted. A pre-download index for one or more multimedia content items is calculated, where the pre-download index represents how likely the user is to interact with the one or more multimedia content items at approximately the predicted time. The indexed multimedia content items are ranked based on the pre-download index of each of the one or more multimedia content items. The ranked multimedia content items are provided to the client application at the predicted time.

19 Claims, 7 Drawing Sheets

SYSTEMS AND METHODS FOR PREDICTIVE DOWNLOAD

TECHNICAL FIELD

The technical field relates to the field of social networks. More particularly, the technical field relates to network resource management in social networks.

BACKGROUND

Social networks provide many features. For instance, many social networks allow users to communicate by exchanging electronic messages, digital content, and by providing other features such as electronic chat rooms and electronic message boards, within a social context. Many social networks also allow users to indicate how they are related to one another. Accordingly, social networks continue to grow in popularity.

Users may access social networks through a variety of devices. For instance, users may access social networks through desktop computers, laptop computers, tablet computing devices, data-enabled mobile phones, and other devices with data capabilities. Access may be provided through a standalone application, such as a mobile application dedicated to the social network, or a web page accessed through a web browser. Due to the fact that social networks rely heavily on computer networks for data transfer, it may be difficult to provide files to a user in an efficient manner. The difficulty is compounded when the files to be provided to the user are extensive in size, as is often true with, for example, multimedia content files or other files containing large amounts of data.

SUMMARY

A computer implemented method, a system comprising at least one processor and memory storing instructions configured to instruct the at least one processor to perform the computer-implemented method, and a computer storage medium storing computer-executable instructions that, when executed, cause a computer system to perform the computer-implemented method are disclosed. In the method, a time a user of a client application is likely to access a preferred network connection is predicted. A pre-download index for one or more multimedia content items is calculated, where the pre-download index represents how likely the user is to interact with the one or more multimedia content items at approximately the predicted time. The indexed multimedia content items are ranked based on the pre-download index of each of the one or more multimedia content items. The ranked multimedia content items are provided to the client application at the predicted time.

In some embodiments, the one or more multimedia content items are part of a download list being provided to the client application at approximately the predicted time. The one or more multimedia content items may comprise at least one of a video file, a music file, or a document file. The one or more multimedia content items may comprise at least one of a hyperlink to a music file, a video file, or a document file.

In an implementation, one or more multimedia content items comprise a video advertisement. The video advertisement may be part of an advertising campaign associated with the predicted time.

In various embodiments, providing includes selecting at least a portion of the ranked multimedia content items for download based on whether pre-download indexes associated with the ranked multimedia content items satisfy a threshold value.

In some embodiments an error notification is received if a download of the one or more multimedia content items at the client application was not successful. In an implementation, a reference to one or more unused multimedia content items is received; and another pre-download index of other multimedia content items similar to the unused multimedia content items is discounted in response to receiving the reference.

In various implementations, the pre-download index of each of the one or more multimedia content items is based on a behavior of the user. The pre-download index of each of the one or more multimedia content items may be based on when the user is likely to use the client application. The pre-download index of each of the one or more multimedia content items may be based on the likelihood of the each of the one or more multimedia content items is downloaded to a client system comprising the client application. The pre-download index of each of the one or more multimedia items may be based on whether the user reacted favorably to other multimedia content items similar to the each of the one or more multimedia content items.

In some embodiments, transfer of the ranked multimedia content items is limited at another time when the user is likely to access a non-preferred network connection. The preferred network connection may comprise an 802.11 wireless network, and the non-preferred network connection may comprise a cellular data network. The preferred network connection may comprise an 802.11 wireless network or a Third Generation (3G) cellular data network, and the non-preferred network connection may comprise a Fourth Generation (4G) or a Fifth Generation (5G) cellular data network.

In some embodiments, the method may be executed by a social networking system. In some embodiments, the one or more multimedia content items are provided by a content provider distinct from a social networking system.

Other features and embodiments are apparent from the accompanying drawings and from the following detailed description.

Figure 1:
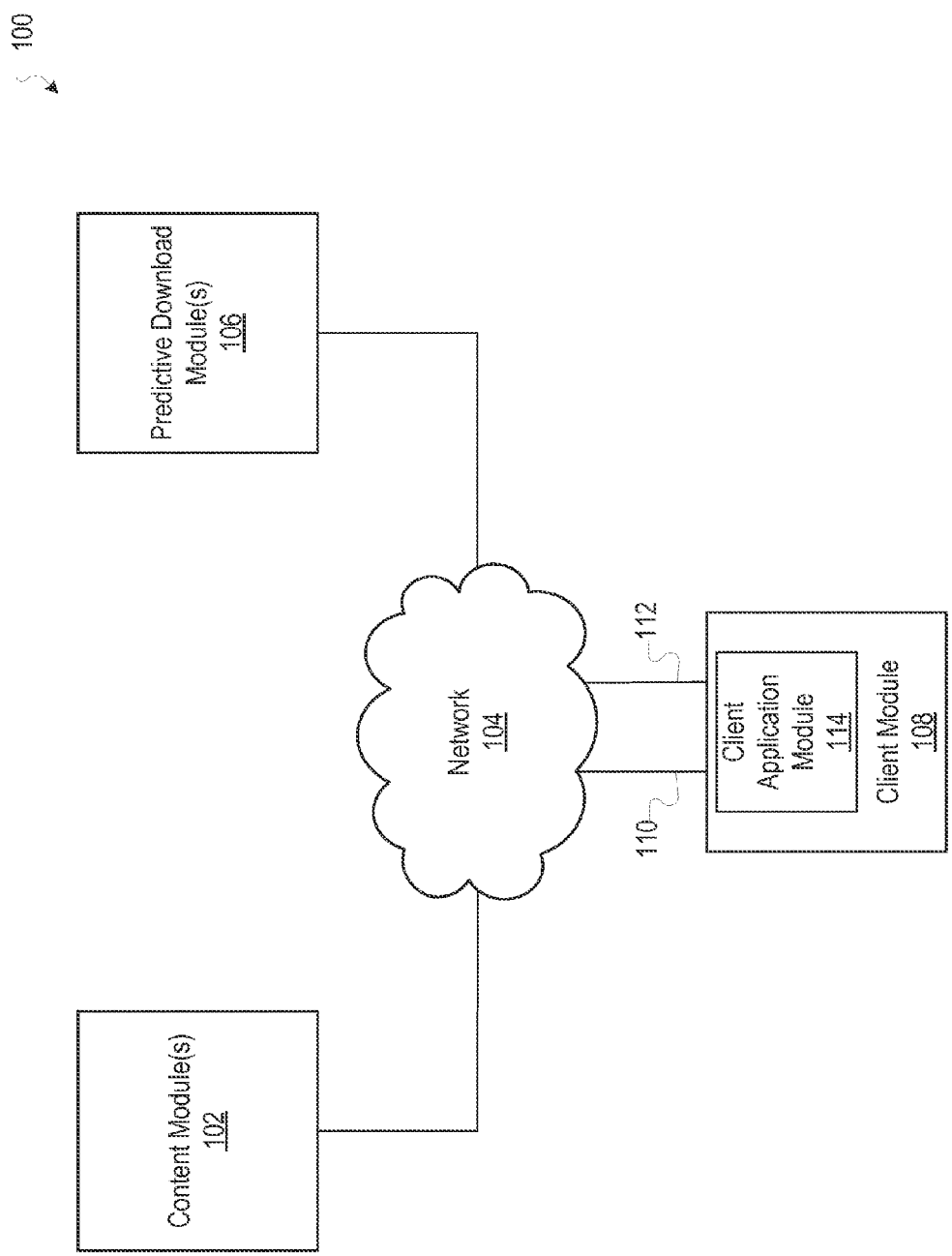
FIG. 1 shows an example of a predictive download environment, in accordance with some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles described herein.

DETAILED DESCRIPTION

Predictive Multimedia Pre-Download

Social networking systems provide popular and easily accessible platforms to connect large numbers of people with different backgrounds and interests. Many social networking systems allow their users to exchange messages, and to share music, video, and other files with each other. Various social networking systems also allow users to explore how they are related to one another. Moreover, social networking systems can be made available on almost every type of computer system, from devices as small as data-enabled mobile phones to devices as large as desktop computer systems. As literally billions of people worldwide use some form of a social networking system, social networking systems also provide an effective platform for distribution of digital content.

Providers of digital content may wish to distribute digital content through a social networking system. For example, advertisers may wish to provide advertisements with multimedia elements (including video and/or audio content) or interactive elements to users of a social networking system. As another example, movie studios may wish to provide movie trailers (and even movies) to users of a social networking system. Similarly, music studios, book publishers, video game publishers, and other content providers or content distributors may wish to make digital content items of some form available to users of a social networking system.

However, distributing digital content through a social networking system may be difficult to accomplish. In many cases, digital content items may include large files with a substantial amount of information. A simple video advertisement, for instance, may include image data for each still image frame, audio data, compression data, interactive hyperlinks, and other data. Users, such as users accessing wireless networks, may attempt to access the social networking system through many different types of networks, including, for example, 802.11 Wifi networks, Third Generation (3G), Fourth Generation (4G), and Fifth Generation (5G) networks, each having different speeds, bandwidth, and throughput. In view of bandwidth and time constraints, streaming a digital content item to a user accessing a wireless network may involve provision to the user of a relatively low-quality version of the digital content item. Streaming the digital content item to such a user may also cause the user to unintentionally use paid wireless networks, such as cellular data networks. Accordingly, it would be desirable to optimize providing files to a user over a network in an effective and efficient manner.

FIG. 1 shows an example of a predictive download environment 100, in accordance with some embodiments. The predictive download environment 100 may include content module(s) 102, a network 104, predictive download module(s) 106, and a client module 108. The components shown in this figure and all figures herein are exemplary only, and other implementations may include additional, fewer, or different components. Some components may not be shown so as not to obscure relevant details.

The content module(s) 102 may provide multimedia content items. Multimedia content items may include any digital content items. Multimedia content items may include text, images, audio, video, interactive content items, etc. In some embodiments, multimedia content items may include music files, video files, documents, etc. Multimedia content items may include content that can be streamed over the network 104 and/or stored on one or more of the predictive download module(s) 106 and/or client module 108. In various embodiments, multimedia content items may include files, such as video files, that would traditionally be downloaded or streamed to the client module 108. In some implementations, the multimedia content items may include advertisements, such as video advertisements. In a specific implementation, the multimedia content items may include hyperlinks to music files, video files, documents, etc. As a result, the content module(s) 102 need not provide actual music, video, documents, etc., but rather could, in some embodiments, provide links to network locations of music, video, documents, etc. on a cloud or other server.

Figure 6:
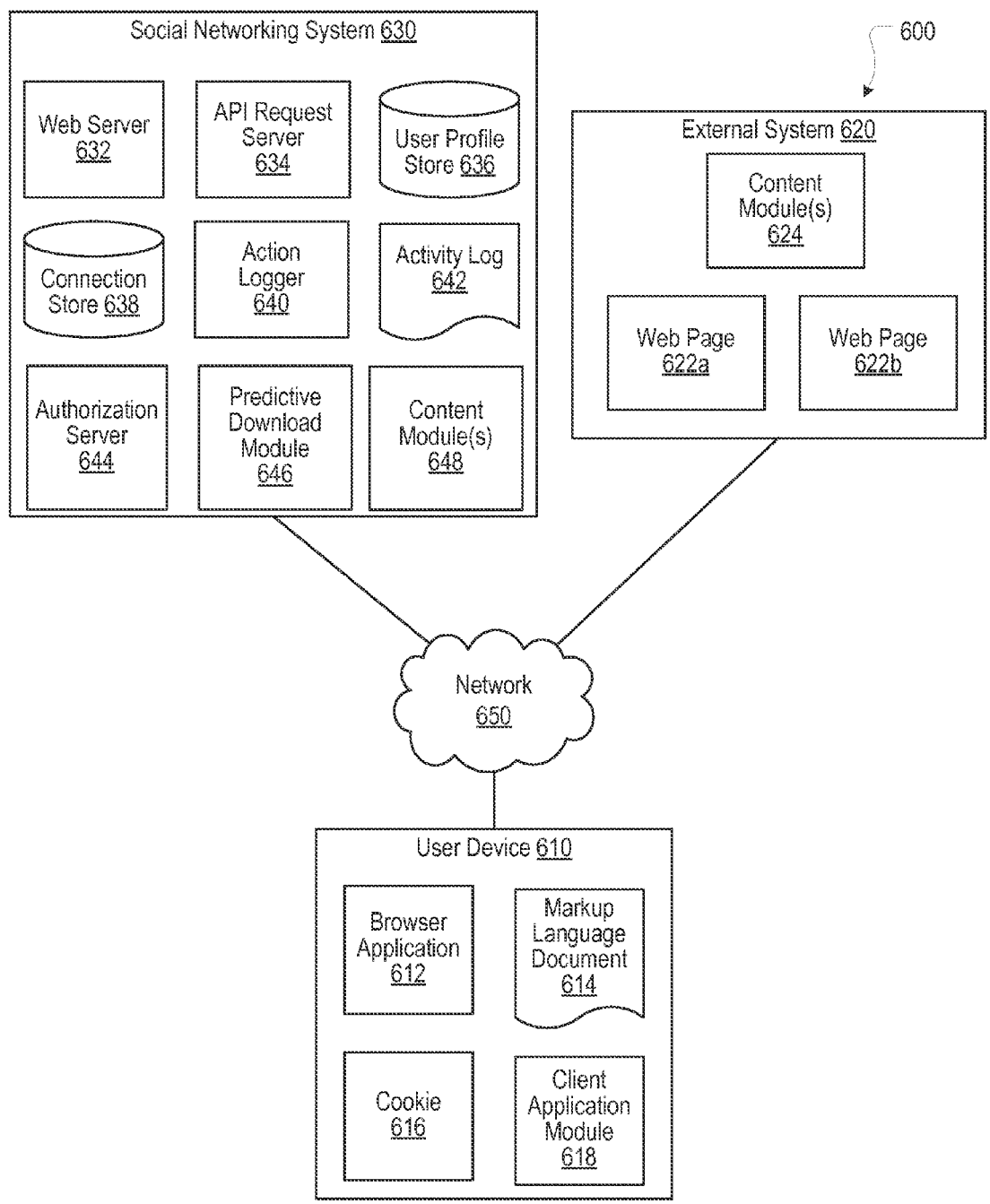
FIG. 6 shows an example of a network diagram of a predictive download environment within a social networking environment, in accordance with some embodiments.

In an implementation, the content module(s) 102 may be incorporated into the social networking environment 600, shown in FIG. 6. For instance, the content module(s) 102 may be incorporated into an external system, an example of which is shown having reference numeral 620 in FIG. 6. In various embodiments, the content module(s) 102 may be incorporated into a social networking system, an example of which is shown having reference numeral 648 in FIG. 6. Though FIG. 1 shows the reference numeral 102 as depicting a single content system, in various embodiments, the content module(s) 102 may comprise more than one content system.

The network 104 may include a communications network, such as a computer network. The network 104 may provide multimedia content items from the content module(s) 102 to one or more of the predictive download module(s) 106 and the client module 108. The network 104 may support wireless and/or wired network protocols. In various embodiments, the network 104 may facilitate coupling of internal components within one or more of the content module(s) 102, the predictive download module(s) 106, and the client module 108.

In various embodiments, the network 104 may support a preferred network connection 110 and a non-preferred network connection 112 for the client module 108. The preferred network connection 110 and the non-preferred network connection 112 may be characterized by different access protocols for accessing the network 104. In some embodiments, the preferred network connection 110 may provide access to the network 104 at a lower cost than the non-preferred network connection 112. In various embodiments, the preferred network connection 110 may provide access to the network 104 at a greater speed than the non-preferred network connection 112. Moreover, in certain embodiments, the preferred network connection 110 may provide access to the network 104 using network access protocols that are more secure than the network access protocols of the non-preferred network connection 112.

Examples of the preferred network connection 110 and the non-preferred network connection 112 are presented herein. As one example, the preferred network connection 110 may comprise a wireless network connection compatible with IEEE 802.11 protocols (e.g., a Wifi network), while the non-preferred network connection 112 may comprise a wireless network connection using a cellular data network (e.g., a 3G, a 4G, or a 5G) network. As another example, the preferred network connection 110 may comprise a first type of cellular data network (e.g., a 3G network), while the non-preferred network connection 112 may comprise a second type of cellular data network (e.g., a 4G network or a 5G network). As yet another example, the preferred network connection 110 may comprise a wired network connection while the non-preferred network connection 112 may comprise any wireless network connection.

Though FIG. 1 shows only a preferred network connection 110 and a non-preferred network connection 112, it is noted that the network 104 may support more than two types of network connections. That is, in various embodiments, the network 104 may support any number of network connections, each characterized by different access protocols to the network 104. A multitude of connections could reflect varying degrees of network connection preferences based on one consideration or a combination of various considerations, such as LAN capabilities, WAN capabilities, cost, etc.

The predictive download module(s) 106 may predict when the client module 108 is to have access to the preferred network connection 110. More specifically, the predictive download module(s) 106 may analyze network connectivity of the client module 108 to predict when the client module 108 is likely to have access to the preferred network connection 110.

The predictive download module(s) 106 may attempt to provide multimedia content items to the client module 108 at the time when access to a preferred network connection 110 is predicted. That is, at one or more of the predicted times, the predictive download module(s) 106 may attempt to download one or more multimedia content items to the client module 108. If the client module 108 does indeed have access to the preferred network connection 110, the predictive download module(s) 106 may provide portions of the download list to the client module 108. In a specific implementation, the download list may include a set of Internet links to particular multimedia content items. The download list may be formatted in any suitable data format.

The predictive download module(s) 106 may determine whether the download was successful or failed. In various embodiments, the downloading process may continue as the client module 108 continues to have access to the preferred network connection 110. The predictive download module(s) 106 may also stop the download if it is determined that the client module 108 does not have access to the preferred network connection 110, if a specific multimedia content item in the download list is not compatible with the client module 108, or upon the occurrence of other events that would indicate a reason to stop the download.

Figure 2:
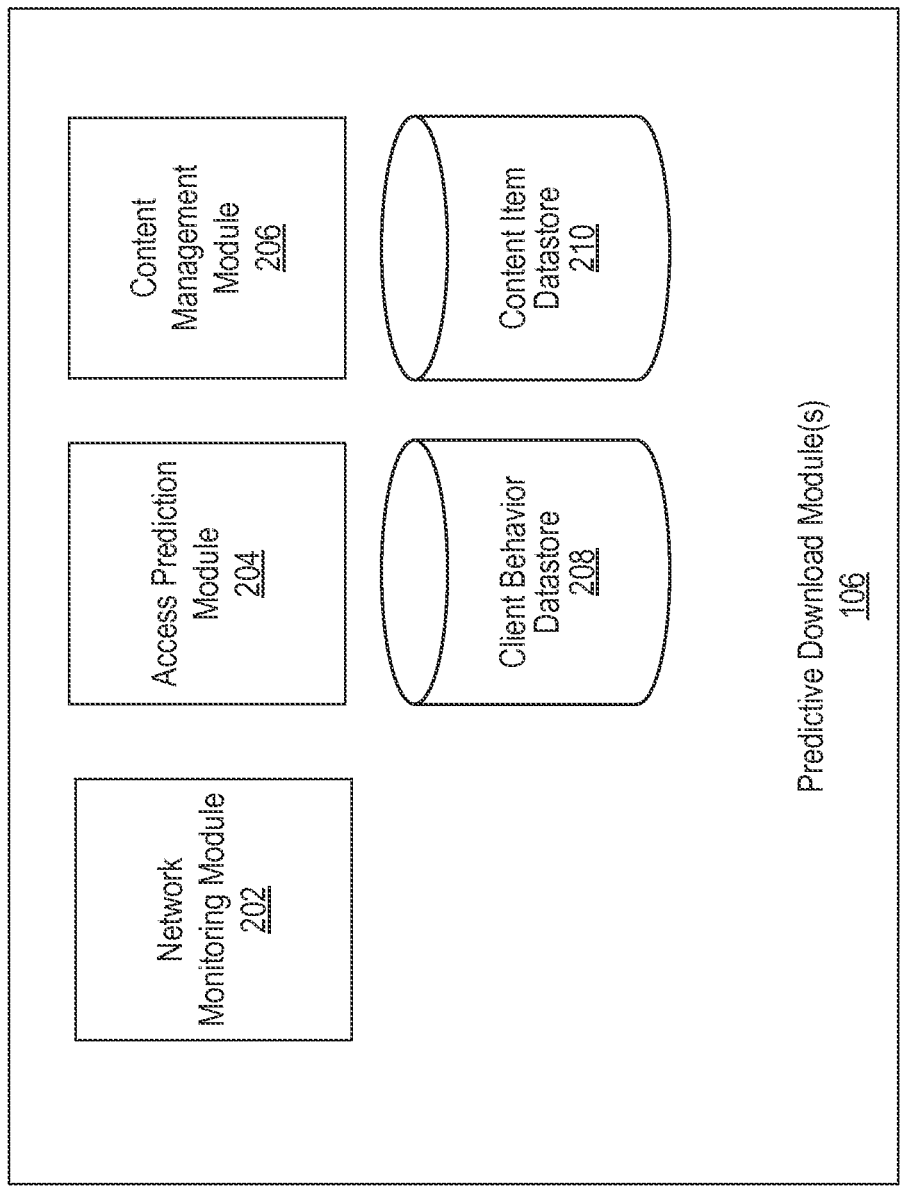
FIG. 2 shows an example of a predictive download module, in accordance with some embodiments.
Figure 3:
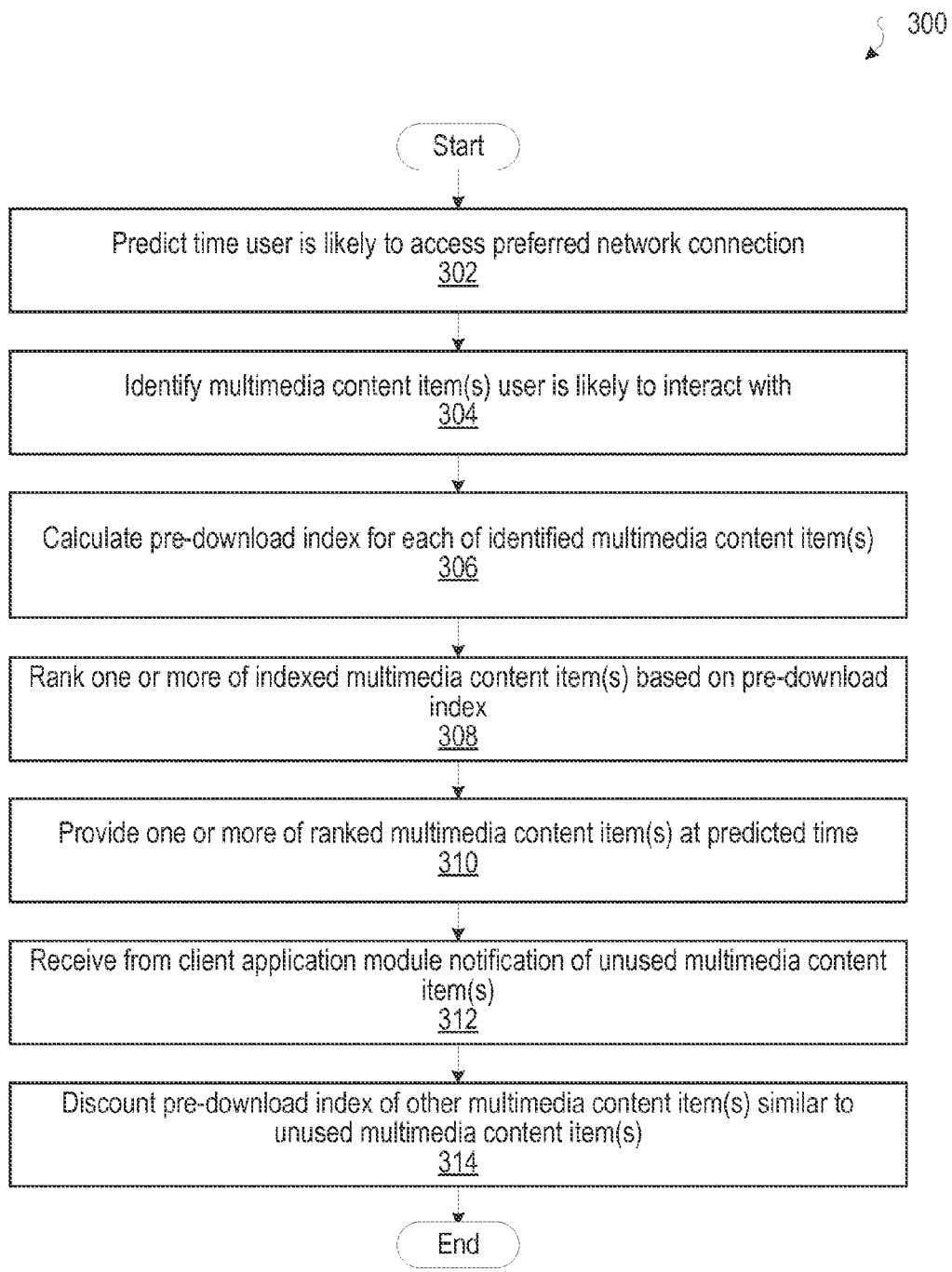
FIG. 3 shows an example of a process for predictively downloading multimedia content items, in accordance with some embodiments.

The predictive download module(s) 106 may also take other actions if the download is stopped. For instance, the predictive download module(s) 106 may instruct the client module 108 to delete multimedia content items that were incompletely downloaded, cannot be played on the client module 108, etc. In some embodiments, the client module 108 may notify the predictive download module(s) 106 of specific multimedia content items that were not viewed, used, or otherwise consumed. In these embodiments, the predictive download module(s) 106 may not provide to the client module 108 in the future other multimedia content items similar to the specific multimedia content items that were not used. FIG. 2 and FIG. 3 discuss the predictive download module(s) 106 in greater detail.

The client module 108 may include any computer system. In various embodiments, the client module 108 may include a desktop computer, a laptop computer, a tablet computing device, a mobile phone with data capabilities, a mobile device having data capabilities, or any other device. The client module 108 may include a client application module 114.

The client application module 114 may allow users to interact with multimedia content items. In some embodiments, the client application module 114 may receive multimedia content items from the content module(s) 102 and/or the predictive download module(s) 106 through the network 104. In an implementation, the client application module 114 may receive download lists of multimedia content items from the predictive download module(s) 106.

The client application module 114 may also monitor the connection it uses to the network 104. More specifically, in some embodiments, the client application module 114 may monitor whether it uses the preferred network connection 110 or the non-preferred network connection 112. The client application module 114 may provide the predictive download module(s) 106 with notifications about which network connection the client module 108 is using to connect to the network 104.

In various embodiments, the client application module 114 may determine whether a particular download list of multimedia content downloaded properly to the client module 108. In the case that the particular download list of multimedia content did not download to the client module 108, the client application module 114 may notify the predictive download module(s) 106 to that effect.

Figure 4:
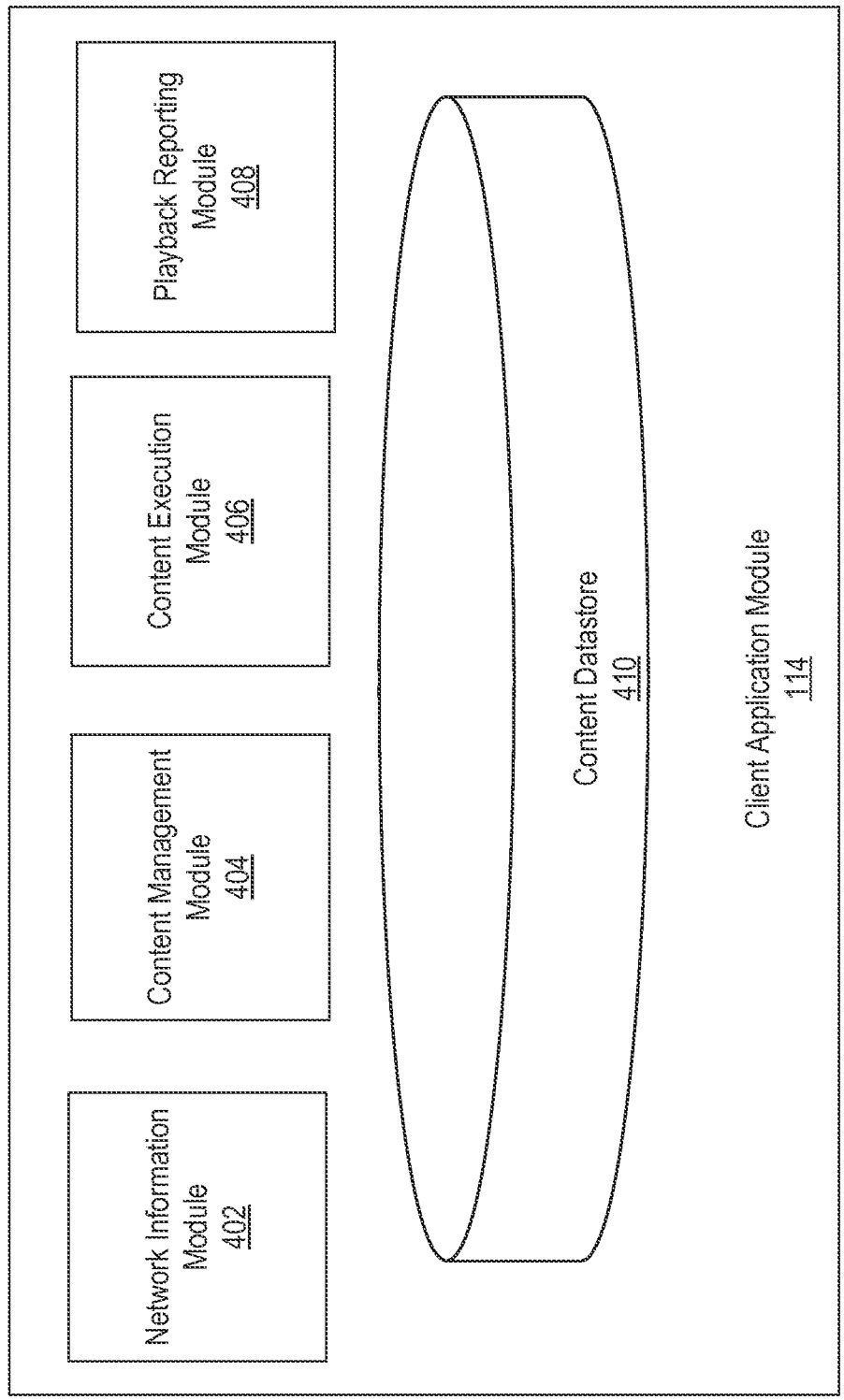
FIG. 4 shows an example of a client application module, in accordance with some embodiments.
Figure 5:
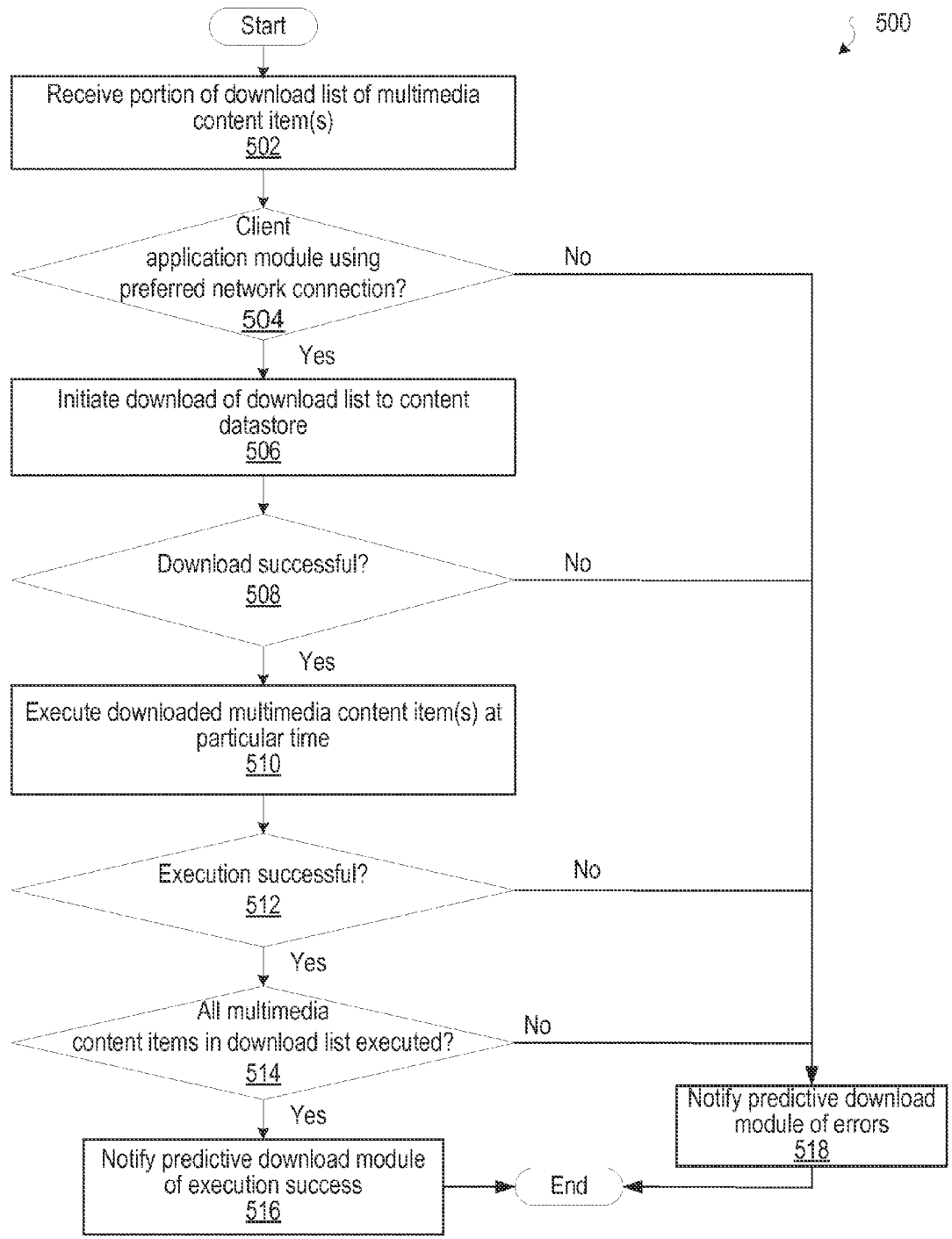
FIG. 5 shows an example of a process for predictively downloading multimedia content items to a client application module, in accordance with some embodiments.

In some embodiments, the client application module 114 may determine whether a user actually interacted with a multimedia content item provided by the predictive download module(s) 106. The client application module 114 may notify the predictive download module(s) 106 of specific multimedia content items that were not interacted with. Such notification may allow the predictive download module(s) 106 to more accurately predict the types of multimedia content items to provide to the client module 108 in the future. FIG. 4 and FIG. 5 discuss the client application module 114 in greater detail.

FIG. 2 shows an example of the predictive download module(s) 106, in accordance with some embodiments. The predictive download module(s) 106 may include a network monitoring module 202, an access prediction module 204, a content management module 206, a client behavior datastore 208, and a content item datastore 210. One or more of the modules and datastores of the predictive download module(s) 106 may be coupled to each other.

The network monitoring module 202 may monitor network connectivity of the client module 108. In some embodiments, the network monitoring module 202 may receive notifications from the client application module 114 about the type of network connection that the client module 108 is using to connect to the network 104. More specifically, the network monitoring module 202 may receive notifications from the client application module 114 about whether the client module 108 is using the preferred network connection 110 or the non-preferred network connection 112. In various embodiments, the network monitoring module 202 may store in the client behavior datastore 208 the information regarding the type of network connection being used by the client module 108.

The access prediction module 204 may predict when the client application module 114 is likely to have access to the preferred network connection 110. The access prediction module 204 may obtain from the client behavior datastore 208 historical data about the times the client application module 114 was connected to the preferred network connection 110 and the non-preferred network connection 112. The access prediction module 204 may provide to the content management module 206 a list of predicted times that the client application module 114 is likely to access the preferred network connection 110.

The content management module 206 may manage multimedia content items stored in the content item datastore 210. The content management module 206 may identify multimedia content items the client application module 114 is likely to interact with when the client module 108 is predicted to access the preferred network connection 110.

In some embodiments, the content management module 206 may calculate a pre-download index for downloading one or more multimedia content items to the client module 108 without requiring that the user of the client module 108 request the multimedia content items. The pre-download index may represent how likely a user is to interact with the multimedia content item at a precise or approximate predicted time. That is, the pre-download index may represent how likely the user is to interact with the multimedia content item on or within a time interval about the predicted time. The pre-download index may reflect how appropriate a multimedia content item is for the client application module 114 given myriad factors, such as the characteristics of the client module 108, the preferred network connection 110 and/or the non-preferred network connection 112, the user of the client application module 114, and other considerations. In various implementations, the pre-download index may provide a basis to select certain multimedia content items for potential download to the client application module 114.

As an example, the pre-download index may be based on behavior of a user of the client application module 114. For example, based on the pre-download index, the content management module 206 may select for potential download the particular multimedia content items based on the extent to which multimedia content items correlate with a social networking newsfeed of the user. More specifically, the content management module 206 may select for potential download the particular multimedia content items based on a past history of stories the user interacted with, the stories a user's friends interacted with, stories similar to stories the user or the user's friends interacted with, etc.

As another example, the pre-download index may be based on when a user is likely to use the client application module 114. For instance, if a user is likely to use the client application module 114 at a particular time of day, the content management module 206 may select, based on the pre-download index, for potential download multimedia content items that are relevant to that time of day. That is, if a user were likely to use the client application module 114 only at night, the content management module 206 may select for potential download advertisements that are more likely to induce purchasing behavior at night.

As yet another example, the pre-download index may be based on a user's network connection. For example, the content management module 206 may select for potential download multimedia content items based on whether those multimedia content items are likely to be completely downloaded to the client module 108 in the time that the user of the client application module 114 is connected to the preferred network connection 110. That is, if the user of the client application module 114 were to be connected to the preferred network connection 110 for only a half hour, over which time the user is likely to be able to only download 100 Megabytes (MB) of data, the content management module 206 may select for potential download particular multimedia content items of less than 100 MB for the client application module 114.

In some embodiments, the pre-download index may be based on whether the user of the client application module 114 reacted favorably to similar multimedia content items. For instance, the content management module 206 may select for potential download particular multimedia content items based on whether the user of the client application module 114 actually interacted with similar multimedia content items. In this example, the content management module 206 may have discounted one or more pre-download indexes of multimedia content item(s) similar to unused multimedia content item(s).

In various embodiments, the pre-download index may be based on how relevant multimedia content items are to a user of the client application module 114. For example, the content management module 206 may select for potential download particular multimedia content items based on proximity of an advertising campaign that uses the multimedia content items. The advertising campaign may be associated with the predicted time. That is, in some implementations, the advertising campaign may be particularly relevant to users at about the predicted time (e.g., a particular advertising campaign may be particularly relevant to users on an evening during the holiday season). As another example, the advertisements may be particularly relevant at a particular time or range of times in a day (e.g., mornings, at noon, evenings, late nights). As yet another example, the advertisements may be particular relevant during a particular season, such as during summer, or during the holiday shopping season. As yet another example, the advertisements may be particularly relevant during a time frame around a specific event (e.g., a month before a set of sports playoffs or the World Series).

As another example, the content management module 206 may select for potential download particular multimedia content items based on how viral the particular multimedia content items are. As yet another example, the content management module 206 may select for potential download particular multimedia content items based on the popularity (e.g., the number of likes, number of comments, or the increase in the number of likes/comments) of the particular multimedia content items.

In some embodiments, the pre-download index may be based on some combination of the foregoing considerations for selection for potential download of the particular multimedia content items. The pre-download index also may be based on factors not expressly listed herein.

In specific implementations, the content management module 206 may rank multimedia content items based on pre-download indexes. The rankings may reflect how likely a user of the client application module 114 is to interact with particular multimedia content items at a particular time. The content management module 206 may also provide multimedia content items to the client application module 114. In some embodiments, the provided multimedia content items may take the form of a download list of multimedia content items. At the predicted time, the content management module 206 may attempt to download the download list to the client application module 114.

The client behavior datastore 208 may store data about the behavior of the client application module 114. In various embodiments, the client behavior datastore 208 may store data about users, social networking data, data related to network connectivity, and other data about the behavior of the client application module 114.

The content item datastore 210 may store particular multimedia content items. The content item datastore 210 may also store download lists of multimedia content items to be provided to a particular client application module 214. In various embodiments, the multimedia content items and the download lists of multimedia content items in the content item datastore 210 may be provided by the content module(s) 102. In an embodiment, the content item datastore 210 may be implemented as any type of data storage unit, including, for example, a cache.

FIG. 3 shows an example of a process 300 for predictively downloading multimedia content items, in accordance with some embodiments. The process 300 is discussed in conjunction with the predictive download module(s) 106 shown in FIG. 2.

At block 302, the access prediction module 204 may predict a time the user is likely to access the preferred network connection 110. The access prediction module 204 may obtain information from the client behavior datastore 208 about the types of network connections that the client module 108 has used at various times. The information may have been based on notifications regarding network connectivity received by the network monitoring module 202. In an implementation, the access prediction module 204 may obtain times the client module 108 has used the preferred network connection 110 as well as the times the client module 108 has used the non-preferred network connection 112. Based on these times, the access prediction module 204 may determine whether the client module 108 is likely to use a particular type of network connection at a particular time. The access prediction module 204 may provide the predicted time to the content management module 206.

At block 304, the content management module 206 may identify multimedia content item(s) in the content item datastore 210 the user is likely to interact with. Identification of the multimedia content item(s) may be based on user behavior, network access patterns related to the client application module 114, factors used to calculate the pre-download index, and other factors. As an example, the content management module 206 may identify a set of advertisements that may be relevant to a specific user. The advertisements may be especially relevant to the user at the predicted time.

At block 306, the content management module 206 may calculate a pre-download index for each of the identified multimedia content items. As discussed, the pre-download index may be based on one or more of the characteristics of the client module 108, the preferred network connection 110 and/or the non-preferred network connection 112, the user of the client application module 114, and other characteristics. For example, the pre-download index may be based on one or more of: behavior of a user of the client application module 114; behavior of a user of the client application module 114, the content management module 206 may select particular multimedia content items based on when a user is likely to use the client application module 114; a user's network connection; whether the user of the client application module 114 reacted favorably to similar multimedia content items; how relevant multimedia content items are to a user of the client application module 114; some combination of the foregoing; and/or factors not expressly listed herein.

At block 308, the content management module 206 may rank the indexed multimedia content item(s) based on their pre-download indexes. The rankings may reflect how likely the user is to interact with the indexed multimedia content item at the predicted time. In some embodiments, the content management module 206 may select or prioritize only those indexed multimedia content items that have a pre-download index beyond a particular threshold value. For instance, the content management module 206 may select the ten or some other number of the highest ranking indexed multimedia content items for download to the client application module 114. In some embodiments, the content management module 206 may also re-rank the indexed multimedia content item(s) based on other factors of importance to the user.

At block 310, the content management module 206 may provide one or more of the ranked multimedia content item(s) to the client application module 114 at the predicted time. The one or more ranked multimedia content item(s) may be selected based on which pre-download indexes associated with the multimedia content item(s) satisfy a selected threshold value. At block 312, the content management module 206 may receive a notification from the client application module 114 of unused multimedia content item(s). For instance, the content management module 206 may receive the identities of specific multimedia content items that did not fully download to the client application module 114, that were not executed by the client application module 114, or otherwise were not used by the client application module 114.

At block 314, the content management module 206 may discount the pre-download index of other multimedia content item(s) that are similar to the unused multimedia content item(s). More specifically, the content management module 206 may search the content item datastore 210 for other multimedia content item(s) that are similar to the unused multimedia content item(s). The other multimedia content item(s) may share one or more characteristics with the unused multimedia content item(s). For instance, the other multimedia content item(s) may be of a size similar to the unused multimedia content item(s). The other multimedia content item(s) may also share other similarities, such as similar user targeting profiles, similar content, similar plots, similar characters, similar creators, and other similarities with the unused multimedia content item(s). In some embodiments, the content management module 206 may discount the pre-download index of the other multimedia content item(s).

FIG. 4 shows an example of a client application module 114, in accordance with some embodiments. The client application module 114 may include a network information module 402, a content management module 404, a content execution module 406, a playback reporting module 408, and a content datastore 410. One or more of the modules and datastores of the client application module 114 may be coupled to each other.

The network information module 402 may provide information about the network connection that the client application module 114 is using. In some embodiments, the network information module 402 may monitor whether the client application module 114 is coupled to the preferred network connection 110 or the non-preferred network connection 112. In an implementation, the network information module 402 may provide notifications to the predictive download module(s) 106 about the network connectivity status of the client application module 114. The notifications may include the time of attempted access, the type of network being accessed, or whether the access attempt was successful. In various embodiments, the network information module 402 may provide the notifications at an interval, periodically, or upon the occurrence of an event, such as a change in network connectivity status. The network information module 402 may also provide the notifications in response to requests from the predictive download module(s) 106. In an implementation, the network information module 402 may incorporate one or more of the features of the network monitoring module 202, shown in FIG. 2.

The content management module 404 may manage multimedia content items stored in the content datastore 410. In an implementation, the content management module 404 may receive multimedia content items from the predictive download module(s) 106. The multimedia content items may be part of a download list provided to the client application module 114. In some embodiments, the content management module 404 may manage the download of the download list. The content management module 404 may further add, edit, and remove multimedia content items in the content datastore 410. In some embodiments, the content management module 404 may provide multimedia content items to the content execution module 406. The content management module 404 may also determine which multimedia content items in the content datastore 410 a user has or has not interacted with. In some embodiments, the content management module 404 may provide the predictive download module(s) 106 with references to the multimedia content items that the client application module 114 did not use.

The content execution module 406 may execute multimedia content items. In various embodiments, the content execution module 406 may play video files, play audio files, or display books, documents, and other files. In some embodiments, the content execution module 406 may facilitate user interaction with multimedia content items. The content execution module 406 may also determine whether particular multimedia content items were successfully executed.

The playback reporting module 408 may report to the predictive download module(s) 106 whether the client application module 114 successfully played back multimedia content item(s) in a download list. In some embodiments, the playback reporting module 408 may also report whether the client application module 114 is using the preferred network connection 110 at the predicted time, whether a download list was successfully downloaded to the content datastore 410, whether particular multimedia content items were successfully executed by the content execution module 406, whether all multimedia content items in a download list were successfully used, and other information.

The content datastore 410 may store multimedia content items. In various embodiments, the content datastore 410 may be managed by the content management module 404. In an embodiment, the content datastore 410 may be implemented as any type of data storage unit, including, for example, a cache.

FIG. 5 shows an example of a process 500 for predictively downloading multimedia content items to a client application module. The process 500 is discussed in conjunction with the client application module 114 shown in FIG. 4.

At block 502, at least a portion of a download list of multimedia content item(s) is received. In a specific implementation, the content management module 404 may receive a portion of a download list of multimedia content item(s) from the predictive download module(s) 106. The portion of the download list may include a portion of a specific multimedia content item or may include data that specifies that one or more multimedia content items are to be provided.

At decision point 504, it is determined whether a client application module is using a preferred network connection. In an implementation, the network information module 402 may determine whether the client application module 114 is connecting to the network 104 through the preferred network connection 110. In the event that the client application module 114 is not using the preferred network connection 110 to connect to the network 104, the process 500 may continue to block 518. In the event that the client application module 114 is using the preferred network connection 110 to connect to the network 104, the process 500 may continue to block 506.

At block 506, a download of the download list to a content datastore is initiated. In a specific implementation, the content management module 404, alone or in combination with the predictive download module(s) 106, may initiate downloading the download list to the content datastore 410. The portions of the download list may include a portion of a specific multimedia content item or may include data that specifies that one or more multimedia content items are to be provided.

At decision point 508, it is determine whether the download of the download list was successful. In a specific implementation, the content management module 404 may compare the version of the download list in the content datastore 410 with the version of the download list that was provided by the predictive download module(s) 106. If the two files do not match, the process 500 may continue to block 518. If the two files match, the process 500 may continue to block 510

At block 510, downloaded multimedia content item(s) are executed at a particular time. In some implementations, the particular time may be at or about the time user of the client application module 114 was predicted by the predictive download module(s) 106 to have access to the preferred network connection 110. In a specific implementation, the content execution module 406 may execute the downloaded multimedia content item(s) in the download list. In various embodiments, the content execution module 406 may also allow a user of the client application module 114 to interact with the downloaded multimedia content item(s).

At decision point 512, it is determined whether the execution was successful. In an implementation, the content execution module 406 may provide information regarding whether the downloaded multimedia content item(s) were successfully executed. The content execution module 406 may also determine whether there were errors in executing the downloaded multimedia content items(s). If the content execution module 406 determines there were errors in executing the downloaded multimedia content items, the process 500 may continue to block 518. If the content execution module 406 determines there were no errors in executing the downloaded multimedia content items, the process 500 may continue to decision point 514.

At decision point 514, it is determined whether all multimedia content items in the download list were executed. In a specific implementation, the content management module 404 may compare the multimedia content items that were executed by the content execution module 406 with the set of multimedia content items within the download list. If all multimedia content items in the download list were not executed, the process 500 may continue to block 518. If all multimedia content items in the download list were executed, the process may continue to block 516.

At block 516, the predictive download module(s) 106 is notified of execution success. In a particular implementation, the playback reporting module 408 may notify the predictive download module(s) 106 that all downloaded multimedia content items were successfully executed.

At block 518, the predictive download module(s) 106 is notified of errors. In various implementations, the playback reporting module 408 may notify the predictive download module(s) 106 of errors in network connectivity, downloading, execution, whether errors in predicting which multimedia content items would be executed by the client application module 114, and/or other errors. Such error reporting may allow the predictive download module(s) 106 to more accurately predict access to the preferred network connection 110, selection of multimedia content items for download lists, the types of multimedia content items that are relevant to a given set of users, and other items of interest.

Social Networking System—Example Implementation

FIG. 6 is a network diagram of an example social networking environment 600 in which to implement the predictive download environment 100, in accordance with some embodiments. The social networking environment 600 includes one or more user devices 610, one or more external systems 620, a social networking system 630, and a network 640. In an embodiment, the social networking system discussed in connection with the embodiments described above may be implemented as the social networking system 630. For purposes of illustration, the embodiment of the social networking environment 600, shown by FIG. 6, includes a single external system 620 and a single user device 610. However, in other embodiments, the social networking environment 600 may include more user devices 610 and/or more external systems 620. In certain embodiments, the social networking system 630 is operated by a social networking system provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 640. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 640. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 640, which may comprise any combination of local area and/or wide area networks, using wired and/or wireless communication systems.

In one embodiment, the network 640 uses standard communications technologies and protocols. Thus, the network 640 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 640 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 640 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). In various embodiments, the network 104 may be implemented as the network 640.

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614. In an embodiment, the user device 610 may include a client application module 618. The client application module 618 may be implemented as the client application module 114.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 640. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. The external system may also include content module(s) 624, as described in more detail herein. In various embodiments, the content module(s) 624 may be implemented as the content module(s) 102.

The social networking system 630 includes one or more computing devices for a social networking system, including a plurality of users, and providing users of the social networking system with the ability to communicate and interact with other users of the social networking system. In some instances, the social networking system can be represented by a graph, i.e., a data structure including edges and nodes. Other data structures can also be used to represent the social networking system, including but not limited to databases, objects, classes. Meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 640.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, an authorization server 644, a predictive download module 646, and content system(s) 648. In an embodiment, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 640. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 640, and the API request server 634 receives the API request. The API request server 634 processes the request by calling an API associated with the API request to generate an appropriate response, which the API request server 634 communicates to the external system 620 via the network 640. For example, responsive to an API request, the API request server 634 collects data associated with a user, such as the user's connections that have logged into the external system 620, and communicates the collected data to the external system 420. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

The social networking system 630 may include the predictive download module 646 and/or the content module(s) 648. In an embodiment, the predictive download module 646 may be implemented as the predictive download module(s) 106. The content module(s) 648 may be implemented as the content module(s) 102.

Hardware Implementation

Figure 7:
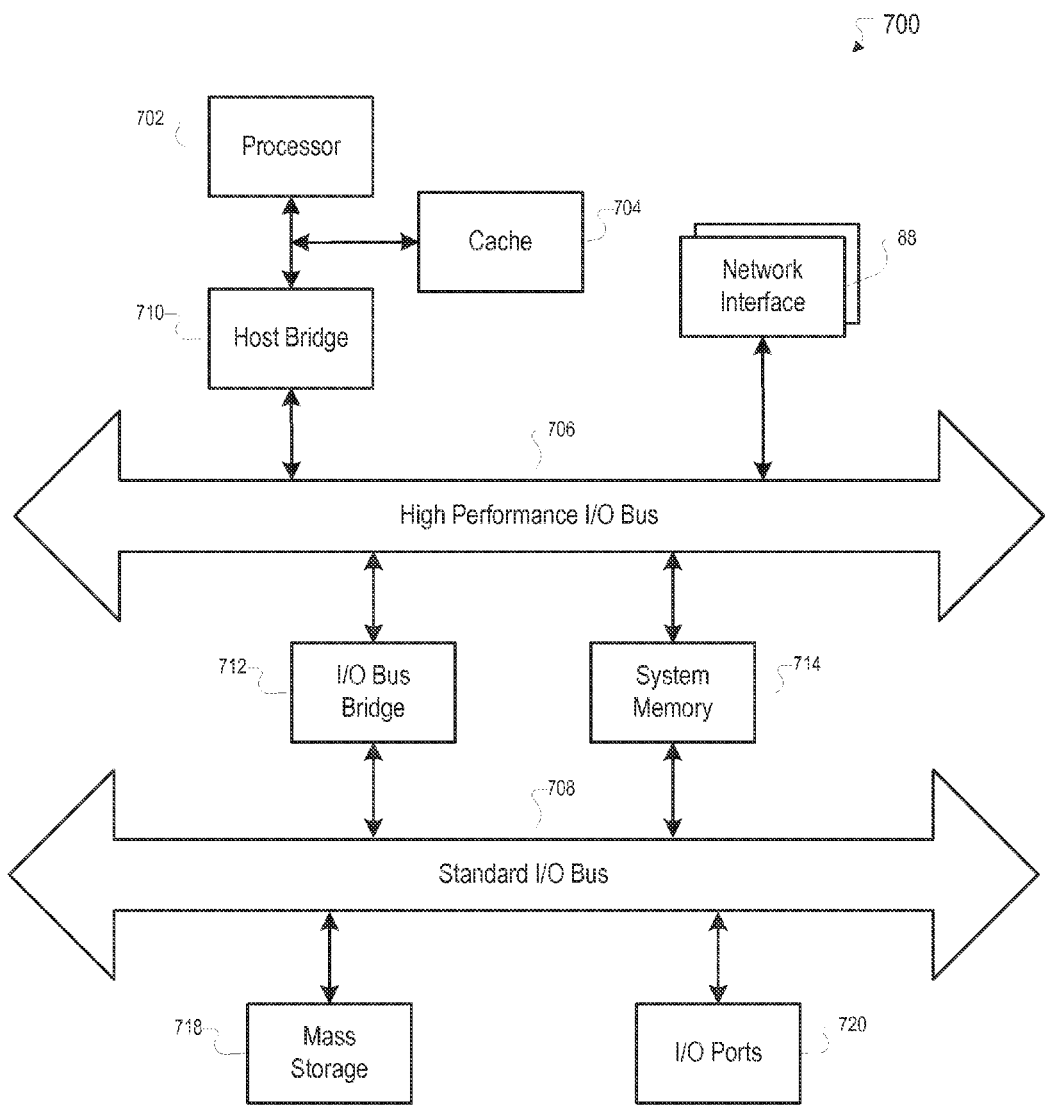
FIG. 7 shows an example of a computer system that may be used to implement one or more of the embodiments described herein in accordance with some embodiments.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment, the computer system 700 may reside with the social networking system 630, the device 610, and the external system 620, or a component thereof. In an embodiment, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and a network interface 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Furthermore, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "various embodiments", "certain embodiments", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed:

1. A computer implemented method comprising:
predicting, by a computer system, a time a user of a client application has at least a particular threshold confidence score of accessing a preferred network connection, wherein the time is predicted based on historical data about the times the client application was connected to the preferred network connection and a non-preferred network connection;
identifying, by the computer system, based on at least one of user behavior, network access patterns related to the client application, or a relevance metric specific to the user, one or more multimedia content items in a content item datastore that are accessible to the user;
calculating, by the computer system, a pre-download index for the one or more multimedia content items, the pre-download index representing a calculated confidence score that the user is to interact with the one or more multimedia content items within an allowable deviation from the predicted time, wherein calculating the pre-download index is based on one or more characteristics associated with at least one of the client application, the preferred network connection, the non-preferred network connection, or the user of the client application;

ranking, by the computer system, the indexed multimedia content items based on the pre-download index of each of the one or more multimedia content items;

selecting, by the computer system, a set of multimedia content items that each at least meets a particular threshold ranking;

providing, by the computer system, to the client application the set of multimedia content items at the predicted time;

receiving, by the computer system, from the client application a reference to one or more unused multimedia content items; and discounting, by the computer system, in response to receiving the reference, another pre-download index of other multimedia content items similar to the unused multimedia content items.

2. The method of claim 1, wherein the one or more multimedia content items are part of a download list being provided to the client application within an allowable deviation from the predicted time.

3. The method of claim 1, wherein the one or more multimedia content items comprise at least one of a video file, a music file, or a document file.

4. The method of claim 1, wherein the one or more multimedia content items comprise at least one of a hyperlink to a music file, a video file, or a document file.

5. The method of claim 1, wherein the one or more multimedia content items comprise a video advertisement.

6. The method of claim 5, wherein the video advertisement is part of an advertising campaign associated with the predicted time.

7. The method of claim 1, wherein the providing includes selecting at least a portion of the ranked multimedia content items for download based on whether pre-download indexes associated with the ranked multimedia content items satisfy a threshold value.

8. The method of claim 1, further comprising:
receiving an error notification if a download of the one or more multimedia content items at the client application was not successful.

9. The method of claim 1, wherein the pre-download index of each of the one or more multimedia content items is based on a behavior of the user.

10. The method of claim 1, wherein the pre-download index of each of the one or more multimedia content items is based on when the user has at least a calculated threshold confidence score of using the client application.

11. The method of claim 1, wherein the pre-download index of each of the one or more multimedia content items is based on a respective calculated confidence score of the each of the one or more multimedia content items being downloaded to a client system comprising the client application.

12. The method of claim 1, wherein the pre-download index of each of the one or more multimedia items is based on whether the user reacted favorably to other multimedia content items similar to the each of the one or more multimedia content items.

13. The method of claim 1, further comprising limiting transfer of the ranked multimedia content items at another time when the user has at least a calculated threshold confidence score of accessing a non-preferred network connection.

14. The method of claim 13, wherein the preferred network connection comprises an Institute of Electrical and Electronics Engineers (IEEE) 802.11 wireless network, and the non-preferred network connection comprises a cellular data network.

15. The method of claim 13, wherein the preferred network connection comprises an Institute of Electrical and Electronics Engineers (IEEE) 802.11 wireless network or a Third Generation (3G) cellular data network, and the non-preferred network connection comprises a Fourth Generation (4G) or a Fifth Generation (5G) cellular data network.

16. The method of claim 1, wherein the method is executed by a social networking system.

17. The method of claim 1, wherein the one or more multimedia content items are
provided by a content provider distinct from a social networking system.

18. A system comprising:
at least one processor;
a memory storing instructions configured to instruct the at least one processor to perform:
predicting a time a user of a client application has at least a particular threshold confidence score of accessing a preferred network connection, wherein the time is predicted based on historical data about the times the client application was connected to the preferred network connection and a non-preferred network connection;
identifying based on at least one of user behavior, network access patterns related to the client application, or a relevance metric specific to the user, one or more multimedia content items in a content item datastore that are accessible to the user;
calculating a pre-download index for the one or more multimedia content items, the pre-download index representing a calculated confidence score that the user is to interact with the one or more multimedia content items within an allowable deviation from the predicted time, wherein calculating the pre-download index is based on one or more characteristics associated with at least one of the client application, the preferred network connection, the non-preferred network connection, or the user of the client application;
ranking the indexed multimedia content items based on the pre-download index of each of the one or more multimedia content items;
selecting a set of multimedia content items that each at least meets a particular threshold ranking;
providing to the client application the set of multimedia content items at the predicted time;
receiving from the client application a reference to one or more unused multimedia content items; and
discounting, in response to receiving the reference, another pre-download index of other multimedia content items similar to the unused multimedia content items.

19. A non-transitory computer storage medium storing computer-executable instructions that, when executed, cause a computer system to perform a computer-implemented method comprising:
predicting a time a user of a client application has at least a particular threshold confidence score of accessing a preferred network connection, wherein the time is predicted based on historical data about the times the client application was connected to the preferred network connection and a non-preferred network connection;
identifying based on at least one of user behavior, network access patterns related to the client application, or a relevance metric specific to the user, one or more multimedia content items in a content item datastore that are accessible to the user;

calculating a pre-download index for the one or more multimedia content items, the pre-download index representing a calculated confidence score that the user is to interact with the one or more multimedia content items within an allowable deviation from the predicted time, wherein calculating the pre-download index is based on one or more characteristics associated with at least one of the client application, the preferred network connection, the non-preferred network connection, or the user of the client application;

ranking the indexed multimedia content items based on the pre-download index of each of the one or more multimedia content items;

selecting a set of multimedia content items that each at least meets a particular threshold ranking;

providing to the client application the set of multimedia content items at the predicted time;

receiving from the client application a reference to one or more unused multimedia content items; and discounting, in response to receiving the reference, another pre-download index of other multimedia content items similar to the unused multimedia content items.

\* \* \* \* \*